(12) United States Patent
Takahashi et al.

(10) Patent No.: US 9,493,114 B2
(45) Date of Patent: Nov. 15, 2016

(54) WARNING DEVICE FOR VEHICLE

(75) Inventors: Yoshihiko Takahashi, Miyoshi (JP);
Tomoya Kawasaki, Miyoshi (JP);
Tetsuya Komoguchi, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 336 days.

(21) Appl. No.: 14/128,042

(22) PCT Filed: Aug. 22, 2011

(86) PCT No.: PCT/JP2011/068886
§ 371 (c)(1),
(2), (4) Date: Dec. 20, 2013

(87) PCT Pub. No.: WO2013/027259
PCT Pub. Date: Feb. 28, 2013

(65) Prior Publication Data
US 2014/0121938 A1    May 1, 2014

(51) Int. Cl.
*B60Q 7/00* (2006.01)
*G08G 1/16* (2006.01)

(52) U.S. Cl.
CPC .............. *B60Q 7/005* (2013.01); *G08G 1/166* (2013.01)

(58) Field of Classification Search
CPC ........ B60Q 7/005; G08G 1/16; G08G 1/116; G08G 1/162
See application file for complete search history.

(56) References Cited

U.S. PATENT DOCUMENTS

| | | | | |
|---|---|---|---|---|
| 5,631,639 A | * | 5/1997 | Hibino | B60K 31/0008 180/167 |
| 5,931,547 A | * | 8/1999 | Lerner | B60T 7/22 303/193 |
| 8,204,276 B2 | * | 6/2012 | Higuchi | G08G 1/16 382/100 |
| 8,941,479 B2 | * | 1/2015 | Igarashi | G06K 9/00798 340/435 |
| 2009/0125237 A1 | | 5/2009 | Kitagawa et al. | |
| 2009/0312914 A1 | * | 12/2009 | Miller | B60Q 9/008 701/45 |
| 2010/0073194 A1 | * | 3/2010 | Ghazarian | G08G 1/017 340/901 |
| 2010/0201508 A1 | * | 8/2010 | Green | B60Q 9/008 340/435 |
| 2010/0271237 A1 | * | 10/2010 | Reed | G01S 13/931 340/932.2 |
| 2012/0041632 A1 | * | 2/2012 | Garcia Bordes | B60W 30/0953 701/29.1 |

FOREIGN PATENT DOCUMENTS

| | | |
|---|---|---|
| JP | 2001 315602 | 11/2001 |
| JP | 2006-099715 A | 4/2006 |
| JP | 2006 193069 | 7/2006 |
| JP | 2009 110163 | 5/2009 |

OTHER PUBLICATIONS

International Search Report Issued Nov. 8, 2011 in PCT/JP11/068886 Filed Aug. 22, 2011.

* cited by examiner

*Primary Examiner* — Hieu T Vo
*Assistant Examiner* — Sherman Manley
(74) *Attorney, Agent, or Firm* — Oblon, McClelland, Maier & Neustadt, L.L.P.

(57) ABSTRACT

A warning device for a vehicle to start a warning at an optimum timing depending on a position at which an object passes near the vehicle. The warning device has a warning part for warning a driver of a presence of the object that will pass near the vehicle. The warning device has a timing changing part for changing a timing of starting the warning via the warning part according to a size of an allowance space from the vehicle to an expected passing position at which the object is expected to pass near the vehicle.

18 Claims, 4 Drawing Sheets

FIG.4

|  | CD | | |
|---|---|---|---|
|  | CD1 OR LESS | GREATER THAN OR EQUAL TO CD1 AND LESS THAN OR EQUAL TO CD2 | GREATER THAN OR EQUAL TO CD2 |
| Vt — Vt₁ OR LESS | T1 | T2 | T3 |
| Vt — GREATER THAN OR EQUAL TO Vt₁ AND LESS THAN OR EQUAL TO Vt₂ | T2 | T3 | T4 |
| Vt — GREATER THAN OR EQUAL TO Vt₂ | T3 | T4 | T5 |

WARNING DEVICE FOR VEHICLE

TECHNICAL FIELD

The present invention relates to a warning device for a vehicle. In particular, the present invention relates to a warning device for a vehicle suitable for warning a driver of presence of an object that will pass near the own vehicle.

BACKGROUND ART

In the prior art, a warning device for a vehicle that warns a driver of presence of an object passing near the own vehicle is known (for example, see Patent Reference No. 1). In this warning device for a vehicle, a time of a collision between the own vehicle and the object (time-to-collision) or a distance thereof (distance-to-collision) is detected, and a display depending on the detection result is displayed on a display device. Therefore, it is possible to warn a driver of presence of the object by the display depending on the time of a collision between the own vehicle and the object or the distance thereof.

PRIOR ART REFERENCE

Patent Reference

Patent Reference No. 1: United States Patent Application Publication No. 2010/0201508 Specification

SUMMARY OF THE INVENTION

Problem to be Solved by the Invention

However, for warning a driver, timing of warning is important. Concerning an object that passes near an own vehicle, importance of warning varies depending on a position at which the object passes near the own vehicle. The importance of warning decreases as the position at which the object passes is relatively farther from the own vehicle. Therefore, it is possible to cause the driver to understand the presence of the object even if the warning is started in late timing. In contrast thereto, the importance of warning increases as the position at which the object passes is relatively nearer to the own vehicle. Therefore, it is difficult to cause the driver to understand the presence of the object unless the warning is started in sooner timing.

However, in the device according to the above-mentioned Patent Reference No. 1, warning is carried out using only a display depending on a time of a collision between an own vehicle and an object or a distance of the collision, and timing of starting warning is not optimum.

The present invention has been devised in consideration of the above-described point, and an object of the present invention is to provide a warning device for a vehicle with which it is possible to start warning in optimum timing depending on a position at which an object will pass near an own vehicle.

Means for Solving the Problem

The above-mentioned object is achieved by a warning device for a vehicle that has warning means for warning a driver of presence of an object that will pass near the own vehicle. The warning device for the vehicle further includes timing changing means for changing timing of starting warning via the warning means according to a size of an allowance space from the own vehicle to an expected passing position where the object is expected to pass near the own vehicle.

Advantageous Effect of the Invention

According to the present invention, it is possible to start warning in optimum timing depending on a position at which an object will pass near an own vehicle.

BRIEF DESCRIPTION OF DRAWINGS

FIG. 4 is a diagram showing a map of warning starting time T varying depending on a speed Vt of an object and an intersecting distance CD used in the warning device for a vehicle according to the present embodiment.

MODES FOR CARRYING OUT THE INVENTION

Below, using the drawings, specific embodiments of a warning device for a vehicle according to the present invention will be described.

Figure 1:
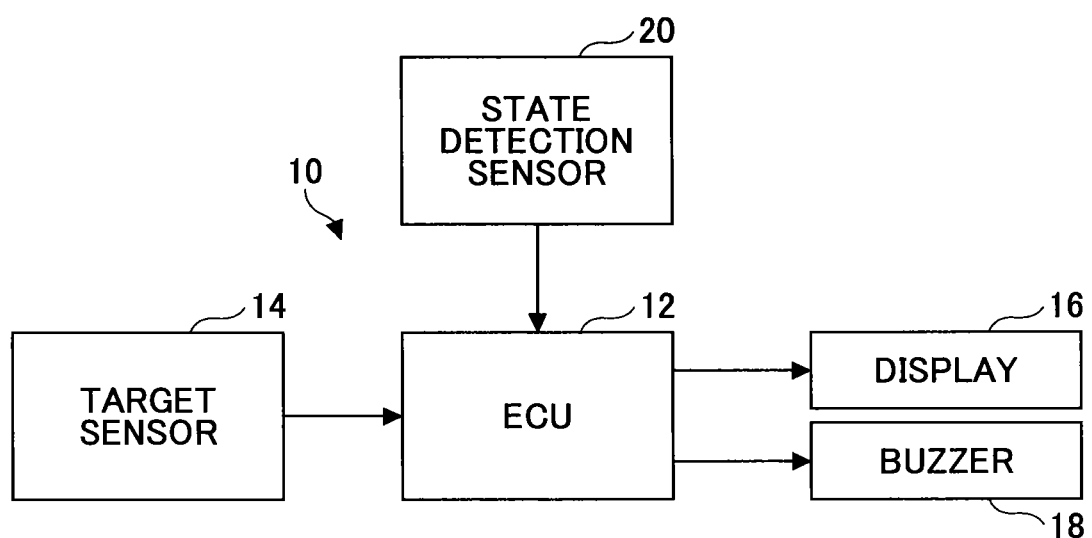
FIG. 1 is a configuration diagram of a warning device for a vehicle according to one embodiment of the present invention.

FIG. 1 shows a configuration diagram of a warning device for a vehicle 10 according to one embodiment of the present invention. The warning device for a vehicle 10 according to the present embodiment is a system to be used at a time of, for example, moving backward in a park for detecting an object (for example, another vehicle) that will pass near an own vehicle (specifically, behind the own vehicle) and warning a driver in the own vehicle of presence of the object.

As shown in FIG. 1, the warning device for a vehicle 10 includes an electronic control unit (hereinafter, referred to as an "ECU") 12 mainly composed of a computer. A target sensor 14 is connected with the ECU 12. The target sensor 14 includes, for example, a millimeter-wave radar, a laser radar, a camera or the like, and is placed at an end part or a central part of a bumper, a spoiler, a back door outside handle or so at a back end of a vehicle body. The target sensor 14 outputs, to the ECU 12, a signal that depends on whether there is an object within a predetermined area behind the own vehicle (especially, in respective left and right lateral back directions) and the distance to the object.

Based on the signal from the target sensor 14, the ECU 12 detects whether there is an object behind the own vehicle, and also detects the distance of the object from the own vehicle or the position of the object when having determined that there is the object. Then, based on the change with time of the detected distance or the detected position, the ECU 12 detects the relative speed between the own vehicle and the object, and an expected travel trajectory of the object with respect to the own vehicle.

A warning display device 16 and a warning buzzer 18 are connected with the ECU 12. The warning display device 16 is, for example, a meter unit installed on an instrument panel in the vehicle interior and visible to the driver in the vehicle, and displays a warning in response to a driving instruction sent from the ECU 12. The warning buzzer 18 is a buzzertype alarm installed in the vehicle interior, and sounds in response to the driving instruction sent from the ECU 12.

Further, a state detection sensor 20 is connected with the ECU 12 for detecting states in the own vehicle including the shift position in a transmission for the vehicle operable by the driver in the vehicle and the vehicle speed, and so forth. The state detection sensor 20 outputs a signal depending on the states in the own vehicle to the ECU 12. Based on the output signal from the state detection sensor 20, the ECU 12 detects the states in the vehicle.

Figure 2:
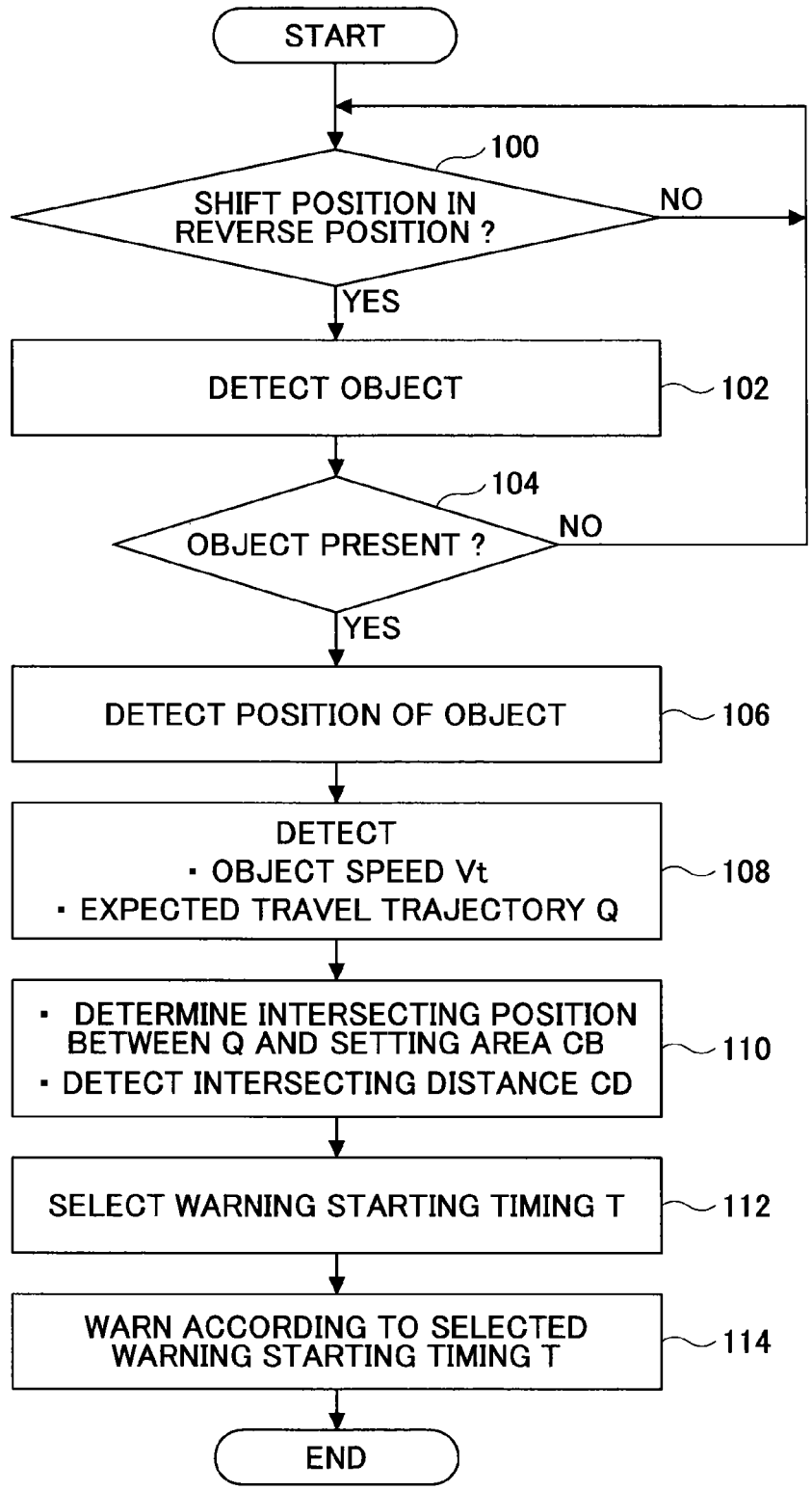
FIG. 2 is a flowchart in one example of a control routine executed by the warning device for a vehicle according to the present embodiment.
Figure 3:
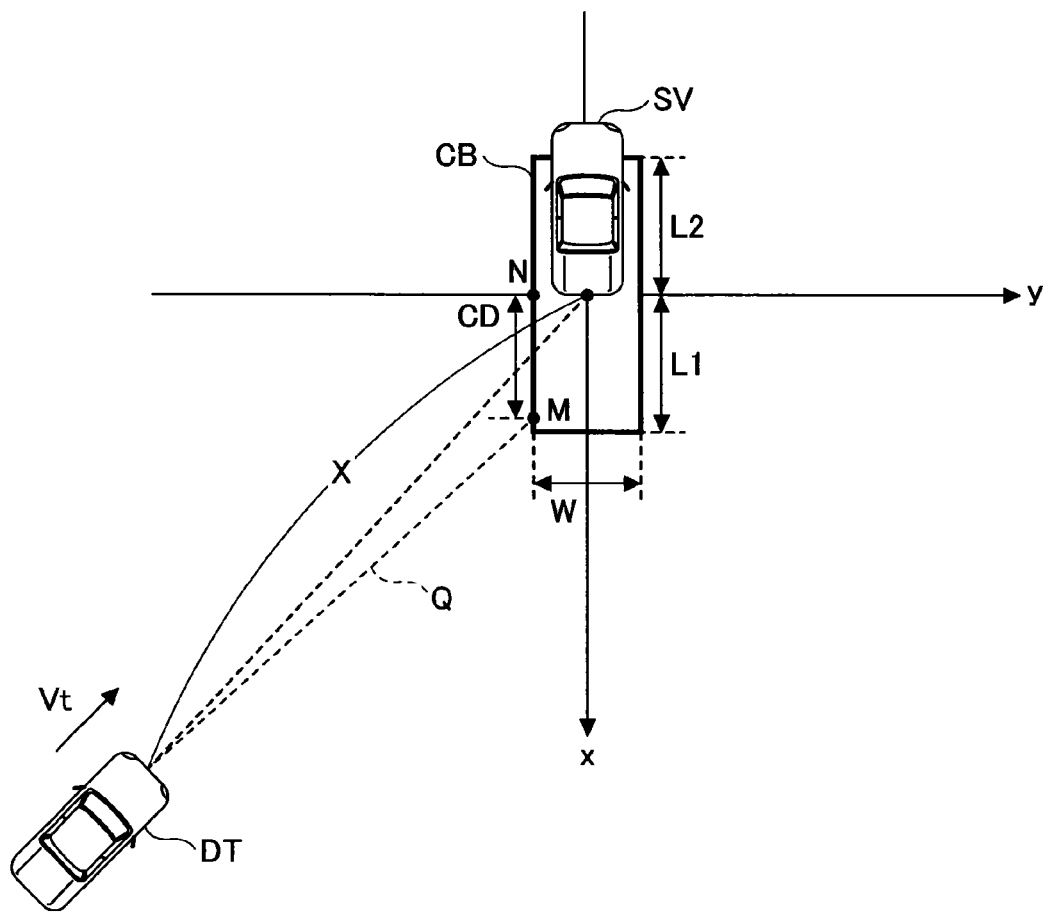
FIG. 3 is a diagram schematically showing a relationship between an own vehicle and an object as a warning object.

Next, with reference to FIGS. 2-4, operations in the warning device for a vehicle 10 according to the present embodiment will be described. FIG. 2 shows a flowchart in one example of a control routine executed by the ECU 12 in the warning device for a vehicle 10 according to the present embodiment. FIG. 3 shows a diagram schematically expressing a relationship between the own vehicle and an object as a warning object.

According to the present embodiment, in a case of having detected that the shift position is in the reverse position based on the output signal from the state detection sensor 20 (at a time of an affirmative determination in step 100), the ECU 12 enters a warnable state (alert status) of being able to carry out a warning using the warning display device 16 and the warning buzzer 18. When having entered the warnable state, the ECU 12 makes the output signal from the target sensor 14 effective, and carries out a process (object detection process) of detecting an object (detection target: DT) near the own vehicle (subject vehicle: SV) using the target sensor 14.

In the object detection process, the ECU 12 detects, based on the output signal of the target sensor 14, whether an object DT that will pass behind the own vehicle is present (step 102). When having detected the presence of the object DT (at a time of an affirmative determination in step 104), the ECU 12 detects the position of the object DT, and detects the distance and the direction from the own vehicle SV to the object DT (step 106). Once having detected the presence of the object DT, the ECU 12 monitors the object DT, measures the change with time of the detected position or the detected distance, and detects the speed Vt of the object DT and the expected travel trajectory Q along which the object DT is expected to travel with respect to the own vehicle SV (step 108).

Note that the speed Vt of the object DT may be the absolute speed of the object DT or may be the relative speed between the object DT and the own vehicle SV. Further, the expected travel trajectory Q can be detected assuming that the own vehicle SV will continuously keep the same traveling state as that at the time of detection or that until the time of detection, and also the object DT will continuously keep the same traveling state as that at the time of detection or that until the time of detection.

The ECU 12 previously stores an area (hereinafter, referred to as a setting area CB (crossing box)) extending over a road surface near the own vehicle using the own vehicle SV as a reference. This setting area CB is, as shown in FIG. 2, shaped like a rectangle. The setting area CB includes a side extending along a vehicle width direction at a position away by a predetermined distance L1 (for example, 6 m) backward from the back end of the vehicle; a side extending along the vehicle width direction at a position away by a predetermined distance L2 (for example, 3 m) forward from the back end of the vehicle; and two sides extending in parallel with the side surfaces of the vehicle (note that the distance W in the y direction by which these two sides are apart in the vehicle width direction may be coincident with the vehicle width of the own vehicle SV or may be slightly (for example, 10 cm or so) greater than the vehicle width of the own vehicle SV).

After detecting the presence of the object DT as mentioned above, the ECU 12 determines the positional relationship between the expected travel trajectory Q of the object DT and the setting area CB, and determines the position (the intersecting position; i.e., an expected passing position at which the object DT is expected to pass near the own vehicle) M at which the expected travel trajectory Q of the object DT intersects the setting area CB. Then, when having determined the intersecting position M, the ECU 12 detects the distance of the intersecting position M from the back end of the own vehicle (specifically, the distance of the intersecting position M from the intersection N of the line in the vehicle width direction that passes through the back end of the vehicle and the side included in the setting area CB, the distance being in the x direction on that side; the intersecting distance) CD (step 110). Note that this intersecting distance CD has a positive value for the side behind the own vehicle SV and a negative value for the front side.

Further, the ECU 12 previously stores information indicating timing (warning starting timing) T of starting warning the driver in the own vehicle when an object DT that will pass behind the own vehicle is present. The warning starting timing T is a time to start warning the driver in the own vehicle by the warning display device 16 and the warning buzzer 18 using as a reference the time point at which the object DT will become close to the own vehicle SV (for example, the time point at which the object DT will reach the intersecting position M), the time to start warning the driver in the own vehicle being before the object DT will become close to the own vehicle SV. The warning starting time T is set to vary depending on the speed Vt of the object DT and the intersecting distance CD.

FIG. 4 shows a map of the warning starting time T varying depending on the speed Vt of the object DT and the intersecting distance CD used in the warning device for a vehicle 10 according to the embodiment. According to the embodiment, specifically, the warning starting timing T is set in such a manner that, the lower the speed Vt of the object DT is, the sooner the warning starting timing T should be, and the higher the speed Vt of the object DT is, the later the warning starting timing T should be; and also, the shorter the intersecting distance CD is, the sooner the warning starting timing T should be, and the longer the intersecting distance CD is, the later the warning starting timing T should be.

For example, as shown in FIG. 4, in a state of the speed Vt being lower than or equal to a first speed Vt1, the warning starting timing T is set at first time T1 when the intersecting distance CD is shorter than or equal to a first distance CD1; second time T2 when the intersecting distance CD exceeds the first distance CD1 and shorter than or equal to a second distance CD2; and third time T3 when the intersecting distance CD exceeds the second distance CD2, respectively. In a state of the speed Vt exceeding the first speed Vt1 and lower than or equal to a second speed Vt2, the warning starting timing T is set at the second time T2 when the intersecting distance CD is shorter than or equal to the first distance CD1; the third time T3 when the intersecting distance CD exceeds the first distance CD1 and shorter than or equal to the second distance CD2; and fourth time T4 when the intersecting distance CD exceeds the second distance CD2, respectively. In a state of the speed Vt exceeding the second speed Vt2, the warning starting timing T is set at the third time T3 when the intersecting distance CD is shorter than or equal to the first distance CD1; the fourth time T4 when the intersecting distance CD exceeds the first distance CD1 and shorter than or equal to the second distance CD2; and fifth time T5 when the intersecting distance CD exceeds the second distance CD2, respectively.

Note that the above-mentioned second speed Vt2 is higher than the first speed Vt1 (for example, 3 m/s), and is set at, for example, 7 m/s. Further, the above-mentioned second distance CD2 is longer than the first distance CD1 (for example, +3 m), and is set at, for example, +4.5 m. Further, it is assumed that T1>T2>T3>T4>T5 holds. For example, T1=3.5 seconds, T2=3.0 seconds, T3=2.5 seconds, T4=2.0 seconds, and T5=1.5 seconds are set.

When having detected the speed Vt of the object DT and the intersecting distance CD as mentioned above, The ECU 12 next selects the warning starting timing T, based on the speed Vt of the object DT and the intersecting distance CD, with reference to the stored information of the warning starting timing T. The ECU 12 thus selects the warning starting timing T to start warning the driver in the own vehicle using the warning display device 16 and the warning buzzer 18 due to the object DT, the presence thereof having been currently detected (step 112).

After thus selecting the warning starting timing T as mentioned above, the ECU 12 sends the driving instruction to the warning display device 16 and the warning buzzer 18 (step 114) when the warning starting timing T has come for the object DT with respect to the own vehicle, the presence of the object DT being detected using the target sensor 14. For example, when T=T2 (=3.0 seconds) has been thus selected, the ECU 12 sends the driving instruction to the warning display device 18 and the warning buzzer 18, 3.0 seconds before the time point at which the object DT will become closest to the own vehicle that is used as a reference.

When the above-mentioned driving instruction has been sent, the warning display by the warning display device 16 and sounding of the warning buzzer 18 are carried out for the driver in the own vehicle. Thus, when the own vehicle moves backward, the warning display by the warning display device 16 and sounding of the warning buzzer 18 are carried out in the warning starting timing T. Therefore, the driver in the own vehicle can see that the object DT will become close to the own vehicle SV, i.e., there is the object DT that will pass near the own vehicle SV.

Generally speaking, for example, in a case where a driver in an own vehicle drives the own vehicle to go backward from a parked position for merging into a main lane, it is necessary to pay attention to an object such as another vehicle that passes in the main lane. At this time, it is preferable from a running safety viewpoint to warn the driver in the own vehicle that the object will become close to the own vehicle and pass near the own vehicle. In this regard, it is advantageous from a running safety viewpoint to warn the driver in the own vehicle via a warning display or sounding of the buzzer in early timing before the object passes near the own vehicle. In this regard such a situation is assumed that the driver is warned in excessively early timing such that the driver can take evasive action. In such a situation, warning may be carried out even when the driver in the own vehicle has already planned to take evasive action in the near future. Thus, the driver in the own vehicle may regard the warning as a nuisance and have an unpleasant feeling. On the other hand, when timing of warning the driver is too late, it is difficult to cause the driver in the own vehicle to previously understand that the object will pass near the own vehicle.

Further, as to an object that will pass near an own vehicle, importance of warning varies depending on the position where the object will pass near the own vehicle. The relatively farther from the own vehicle the position where the object will pass near the own vehicle is, the more the importance of warning decreases. Therefore, even when the warning is started in late timing, it is possible to cause the driver in the own vehicle to understand the presence of the object. On the other hand, the relatively nearer from the own vehicle the position where the object will pass near the own vehicle is, the more the importance of warning increases. Therefore, it is difficult to cause the driver to understand the presence of the object unless the warning is started in early timing.

Further, if warning starting timing were determined uniformly without regard to the speed of an object, the distance from an own vehicle to the position where warning is started would largely vary. Further, the lower the speed of the object is, the greater its margin of an increase in the speed is. Therefore, such a situation will be more likely to occur that when the increase in the speed has occurred, the object passes near the own vehicle considerably sooner than the expected timing.

In contrast thereto, in the warning device for a vehicle 10 according to the present embodiment, when an object DT that will pass near an own vehicle is present at a time of moving the own vehicle backward, it is possible to start, in timing before the passing thereof, warning display via the warning display device 16 and sounding of the warning buzzer 18 for the driver in the own vehicle. Further, it is possible to change the warning starting timing via the warning display and sounding of the buzzer depending on the speed Vt of the object DT and the intersecting distance CD.

Specifically, it is possible to make the warning starting timing sooner as the intersecting distance CD is shorter, and later as the intersecting distance CD is longer. Therefore, it is possible to cause the driver in the own vehicle to positively understand the presence of the object that will pass near the own vehicle before the passing thereof without giving the driver in the own vehicle an unpleasant feeling due to the warning. Thus, in the warning device for a vehicle 10 according to the present embodiment, it is possible to start warning in optimum timing depending on a passing position (specifically, an expected passing position M) of an object DT that will pass near an own vehicle. Thereby, it is possible to urge the driver in the own vehicle to take action to avoid a collision with the object (for example, a braking operation) at a time of the own vehicle's moving backward, and improve running safety at a time of the own vehicle's moving backward.

Further, it is possible to make warning starting timing sooner as the speed Vt of an object DT is lower, and later as the speed Vt of an object DT is higher. Therefore, when an object DT will pass behind an own vehicle, it is possible to avoid a great variation according to the speed of the object DT in the distance from the own vehicle SV to the position where warning will be started. Further, it is possible to avoid such a situation that the object DT passes near the own vehicle considerably sooner than the expected timing. Therefore, in the warning device for a vehicle 10 according to the present embodiment, it is possible to start warning in optimum timing depending on the speed of an object DT, and thereby, it is possible to improve running safety at a time of the own vehicle's moving backward.

Note that in the above-mentioned embodiment, the warning display device 16 and the warning buzzer 18 correspond to "warning means" recited in the claims, the intersecting distance CD corresponds to an "allowance space" recited in the claims, and changing by the ECU 12 the warning starting timing T depending on the speed Vt of an object DT and the intersecting distance CD corresponds to "timing changing means" recited in the claims.

Note that in the above-mentioned embodiment, concerning changing the warning starting timing T, the speed Vt of an object DT is classified into the three levels, and the intersecting distance CD is classified into the three levels, as shown in FIG. 4. However, the present invention is not limited thereto. It is possible to change the warning starting timing T into two or more levels depending on the speed Vt of an object DT, and also, change the same into two or more levels depending on the intersecting distance CD. For example, it is also possible to change the warning starting timing T linearly depending on the speed Vt of an object DT, and also, change the same linearly depending on the intersecting distance CD.

Further, in the above-mentioned embodiment, the warning starting timing T is changed depending on the intersecting distance CD, and also, is changed depending on the speed Vt of an object DT. However, the present invention is not limited thereto. It is possible to change the warning starting timing T at least depending on the intersecting distance CD, and thus, it is possible to change the same depending on a parameter (such as the backward-moving speed of an own vehicle SV, for example) other than the speed Vt of an object DT.

Further, in the above-mentioned embodiment, the warning starting timing T is changed depending on the intersecting distance CD. However, when the intersecting distance CD has a negative value, it is also possible to warn a driver for urging the driver to take action of attempting to avoid a collision or ease a collision (such as braking, for example), further, aside from warning display via the warning display device 16 and sounding of the warning buzzer 18.

Further, in the above-mentioned embodiment, both warning display via the warning display device 16 and sounding of the warning buzzer 18 are carried out as warning for informing the driver in an own vehicle of presence of an object that will pass behind the own vehicle. However, it is also possible to carry out only either thereof. Further, it is also possible to carry out secondary warning for urging a driver to take action of attempting to avoid a collision or ease a collision in a case where the likelihood of a collision between the own vehicle SV and the object DT has been increased to be higher than equal to a predetermined value. The secondary warning is, for example, braking using a braking device in the own vehicle SV, or actuating a stimulating device that can microscopically vibrate the driver seat or the steering wheel when the stimulating device has been mounted in the own vehicle SV.

Further, in the above-mentioned embodiment, the rectangular setting area CB is set for an own vehicle SV, and then, the intersecting distance CD is used as an allowance space as a parameter for changing the warning starting timing T. Note that the intersecting distance CD is a distance between the intersecting position M that is an intersecting position between the setting area CB and the expected travel trajectory Q of the object DT and the intersection N that is an intersection between the line in the vehicle width direction passing through the back end of the vehicle and the setting area CB. However, the present invention is not limited thereto. It is possible to use, as an allowance space as a parameter for changing the warning starting timing T, a distance between an own vehicle SV and an object DT at a time when the object DT will become closest to the own vehicle SV, for example, without setting the setting area CB.

The above-mentioned distance is obtained based on positional relationship between the expected travel trajectory Q of the object DT and the own vehicle SV. Note that the distance between the own vehicle SV and the object DT at a time when the object DT will become closest to the own vehicle SV may be the linear distance that is an absolute one without regard to the direction in which the own vehicle SV faces or the linear distance of the component in the front-back direction of the own vehicle SV.

Further, it is also possible to use, as an allowance space as a parameter for changing the warning starting timing T, the distance from the center of the back end of an own vehicle SV to an intersecting position between the front-back-direction line passing through the above-mentioned center and the expected travel trajectory Q of the object DT, without setting the setting area CB.

Further, in the above-mentioned embodiment, warning is carried out when an own vehicle moves backward. However, the present invention is not limited thereto. It is also possible to apply the present invention to a configuration that carries out warning when an own vehicle moves forward.

DESCRIPTION OF REFERENCE NUMERALS

10 Warning Device for Vehicle
12 Electronic Control Unit (ECU)
14 Target Sensor
16 Warning Display Device
18 Warning Buzzer
SV Own Vehicle
DT Object
Vt Speed of Object DT
Q Expected Travel Trajectory of Object DT
CB Setting Area Obtained Using Own Vehicle SV as Reference
CD Intersecting Distance
M Intersecting Position (Expected Passing Position)

The invention claimed is:

1. A warning device for a vehicle, comprising:
circuitry configured to:
warn a driver of a presence of an object that passes near the vehicle; and
change, before the object reaches an expected passing position where the object is expected to pass near the vehicle with respect to a time point at which the object reaches the expected passing position, timing of starting a warning according to a size of an allowance space from the vehicle to the expected passing position and a relative speed between the vehicle and the object or a speed of the object, wherein
the smaller the allowance space is, the sooner the circuitry makes the timing of starting the warning,
the greater the allowance space is, the later the circuitry makes the timing of starting the warning,
the lower the relative speed or the speed is, the sooner the circuitry makes the timing of starting the warning, and
the higher the relative speed or the speed is, the later the circuitry makes the timing of starting warning.

2. A warning device for a vehicle, comprising:
circuitry configured to:
warn a driver of presence of an object that passes near the vehicle; and
change, before the object reaches an expected passing position where the object is expected to pass near the vehicle with respect to a time point at which the object reaches the expected passing position, timing of starting a warning according to a size of an allowance space from the vehicle to the expected passing position and a relative speed between the vehicle and the object or a speed of the object, wherein the lower the relative speed or the speed is, the sooner the circuitry makes the timing of starting the warning, and the higher the relative speed or the speed is, the later the circuitry makes the timing of starting the warning.

3. The warning device for a vehicle as claimed in claim 1, wherein as the change in the timing of starting the warning, the circuitry changes a time to start the warning before the object reaches the expected passing position.

4. The warning device for a vehicle as claimed in claim 2, wherein as the change in the timing of starting the warning, the circuitry changes a time to start the warning before the object reaches the expected passing position.

5. The warning device for a vehicle as claimed in claim 1, wherein the expected passing position is an intersecting position between an expected travel trajectory of the vehicle and an expected travel trajectory of the object, and the allowance space is a distance from the vehicle to the intersecting position.

6. The warning device for a vehicle as claimed in claim 2, wherein the expected passing position is an intersecting position between an expected travel trajectory of the vehicle and an expected travel trajectory of the object, and the allowance space is a distance from the vehicle to the intersecting position.

7. The warning device for a vehicle as claimed in claim 3, wherein the expected passing position is an intersecting position between an expected travel trajectory of the vehicle and an expected travel trajectory of the object, and the allowance space is a distance from the vehicle to the intersecting position.

8. The warning device for a vehicle as claimed in claim 4, wherein the expected passing position is an intersecting position between an expected travel trajectory of the vehicle and an expected travel trajectory of the object, and the allowance space is a distance from the vehicle to the intersecting position.

9. The warning device for a vehicle as claimed in claim 1, wherein the circuitry is configured to carry out the warning when the vehicle moves backward.

10. The warning device for a vehicle as claimed in claim 2, wherein the circuitry is configured to carry out the warning when the vehicle moves backward.

11. The warning device for a vehicle as claimed in claim 3, wherein the circuitry is configured to carry out the warning when the vehicle moves backward.

12. The warning device for a vehicle as claimed in claim 4, wherein the circuitry is configured to carry out the warning when the vehicle moves backward.

13. The warning device for a vehicle as claimed in claim 5, wherein the circuitry is configured to carry out the warning when the vehicle moves backward.

14. The warning device for a vehicle as claimed in claim 6, wherein the circuitry is configured to carry out the warning when the vehicle moves backward.

15. The warning device for a vehicle as claimed in claim 7, wherein the circuitry is configured to carry out the warning when the vehicle moves backward.

16. The warning device for a vehicle as claimed in claim 8, wherein the circuitry is configured to carry out the warning when the vehicle moves backward.

17. The warning device for a vehicle as claimed in claim 1, wherein the circuitry is configured to avoid a great variation in a distance from the vehicle to a position where the warning will be started as determined based upon the relative speed or the speed by making the timing of starting the warning sooner as the relative speed or the speed is lower and making the timing of starting the warning later as the relative speed or the speed is higher.

18. The warning device for a vehicle as claimed in claim 2, wherein the circuitry is configured to avoid a great variation in a distance from the vehicle to a position where the warning will be started as determined based upon the relative speed or the speed by making the timing of starting the warning sooner as the relative speed or the speed is lower and making the timing of starting the warning later as the relative speed or the speed is higher.

* * * * *